United States Patent Office 3,192,246
Patented June 29, 1965

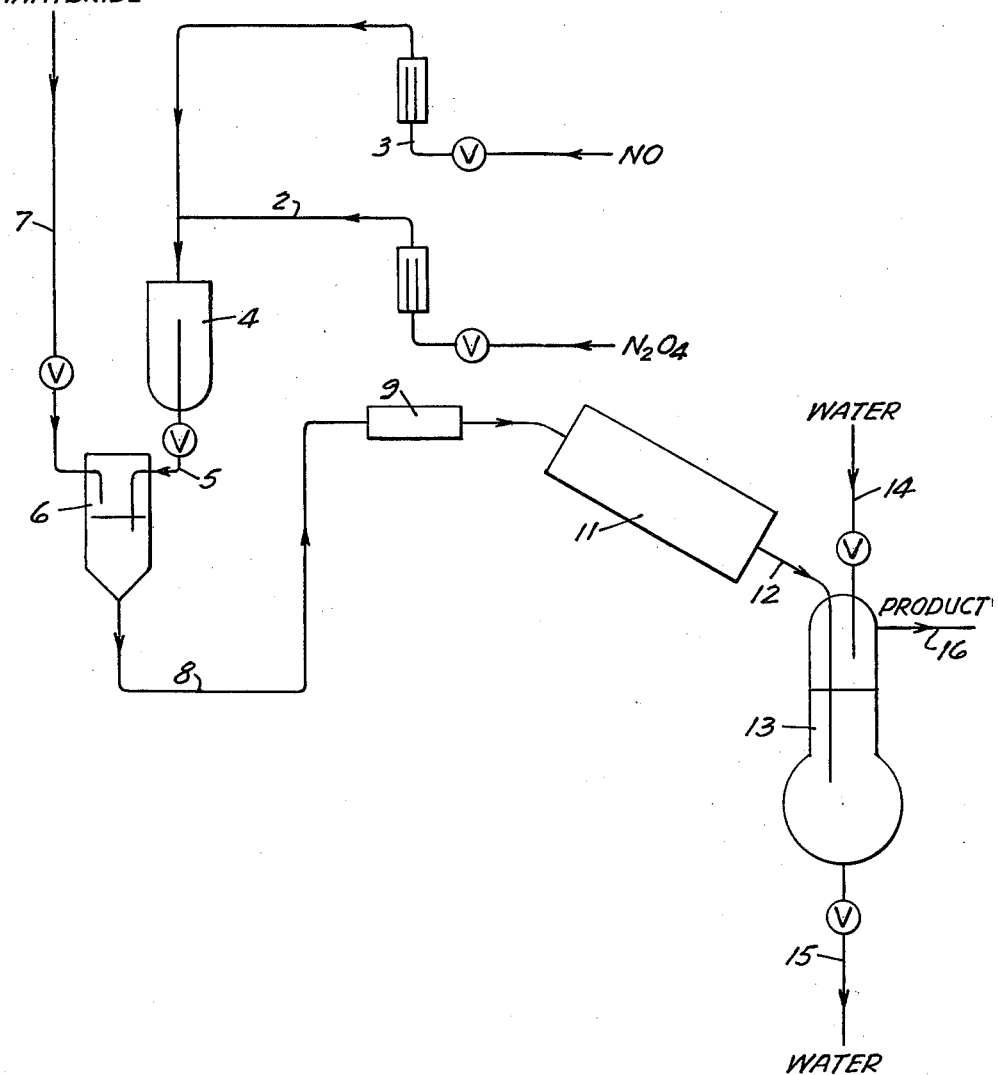

3,192,246
CHEMICAL PROCESS FOR MAKING HALO-
GENATED COMPOUNDS
George H. Crawford, Jr., White Bear Lake, David E. Rice, Minneapolis, and Dean R. Yarian, Lake Elmo, Minn., assignors to Minnesota Mining and Manufacturing Company, St. Paul, Minn., a corporation of Delaware
Filed Oct. 2, 1962, Ser. No. 227,839
16 Claims. (Cl. 260—466)

This application is a continuation-in-part of our prior and copending application Serial No. 147,492, filed October 25, 1961, now abandoned.

The present invention relates to a new method for the preparation of halogen-containing acyl nitrites. In one aspect, this invention relates to new fluorine-containing acyl nitrites which can be converted to fluorine-containing nitrosoalkanes.

Halogen-containing nitrosoalkanes are known in the art and have been suggested as monomers for use in producing useful chemically stable plastics and elastomers. For example, trifluoronitrosomethane can be copolymerized with tetrafluoroethylene to produce a high molecular weight elastomeric polymer which has good chemical and heat stability. One of the serious draw-backs in the commercialization of the production of polymers from fluorine-containing nitrosoalkanes has been the lack of an economical method for producing the nitrosoalkanes in substantially pure form. Numerous methods for the production of the nitrosoalkanes have been suggested. One of these methods involves the reaction of a fluorine-containing alkyl halide with nitric oxide to produce directly the corresponding nitrosoalkane. This method, however, has disadvantages in that the alkyl halides are chain transfer agents, and contamination of the nitrosoalkane product with the alkyl halides effectively prevents the production of high molecular weight polymers. In order to overcome this deficiency of the above method of preparing the nitrosoalkane, costly steps are necessary to purify the nitrosoalkane product to be used in the polymerization. It has also been suggested that the nitrosoalkanes may be made by reacting a fluorine-containing anhydride with a nitrosyl halide to produce the corresponding fluorinated acyl nitrite which is then converted to the nitrosoalkane by decarboxylation. Also, it has been suggested that the fluorine-containing acyl nitrite may be prepared by reacting a fluorine-containing acid salt of a metal with nitrosyl halide. In this instance, the fluorine-containing acyl nitrite is also converted to the nitrosoalkane by decarboxylation. These latter two methods have the disadvantage that a substantial amount of by-products are produced, which, in turn, results in a low weight yield of the desired product. It is much to be desired, therefore, to provide a process for the production of halogen-containing acyl nitrites which can be converted into the corresponding nitrosoalkanes or which are new and useful products in themselves, which process produces the nitrite in high yields without the formation of by-products.

An object of this invention is to provide a novel process for the production of halogen-containing acyl nitrites.

Yet another object is to provide new and useful acyl nitrites.

Another object of this invention is to provide halogen-containing acyl nitrites of high purity.

Still another object of this invention is to provide a combination process for the production of halogen-containing nitrosoalkanes.

Various other objects and advantages will become apparent to those skilled in the art from the accompanying description and disclosure.

In accordance with this invention, an aliphatic anhydride containing at least one halogen atom in each of the alpha positions is reacted with nitrogen sesquioxide ($N_2O_3$) to produce directly the corresponding halogen-containing acyl nitrite. No by-products are formed by the reaction, and one mol of anhydride of a monoacid is converted directly to two mols of acyl nitrite, or one mol of anhydride of a diacid is converted into one mol of diacyl nitrite. The reaction is effected in the liquid phase at a temperature between about $-50°$ and about $110°$ C., preferably between about $-10°$ and about $+25°$ C. The proportion of reactants is not critical; preferably equivalent proportions are utilized, but the reactants may be utilized in a mol ratio of 10:1 to 1:10 without departing from the scope of this invention. The nitrite thus produced may be utilized as a chemical intermediate, such as the conversion of the nitrite to the halogen-containing nitrosoalkane by decarboxylation. The halogen-containing nitrosoalkane may then be reacted with an ethylenically unsaturated olefin to produce a polymer which may be in the form of an oil, or in the form of a high molecular weight plastic or elastomeric material. The polymeric oils produced are useful as lubricants, plasticizers and solvents. The plastics and elastomers produced from the nitrosoalkane are used to mold articles therefrom, to prepare self-supporting protective films, or are used for coating fabrics and surfaces.

The aliphatic anhydride, containing at least one halogen in each of the alpha positions, which is used as one of the starting materials for the above reaction, is preferably substituted with at least two halogens on each of the alpha carbon atoms. Best results have been observed when the alpha carbon atoms are completely substituted with halogens since the halogens contribute a powerful electron withdrawing effect. Such halogens on the alpha carbon atoms are preferably the gaseous halogens, fluorine and chlorine. At least one of the halogen atoms on each of the alpha carbon atoms being fluorine is most preferable.

The most useful of the anhydrides for preparing the acyl nitrites to be used ultimately in preparing the nitrosoalkanes for polymerization are those in which the carbon atoms other than the alpha carbon atoms are also completely substituted with halogens with respect to hydrogen. Preferably, these halogens are also the gaseous halogens, fluorine and chlorine.

The anhydrides utilized as reactants in accordance with this invention can be prepared from halogen-containing monobasic aliphatic acids and dibasic aliphatic acids, which acids contain at least one halogen atom in each of the alpha positions. The preferred acids are those which correspond to the preferred anhydrides defined above with regard to halogen substitution; that is, the halogen substitution is preferably on the alpha carbon atom of the acid. The acids can be converted to the anhydride in the conventional manner involving the reaction of the acid with phosphorous trichloride to produce the corresponding acid halide and with an alkali hydroxide, such as sodium hydroxide, to produce the corresponding alkali salt. The acid halide and the alkali salt of the acid are then coreacted to produce the anhydride. The anhydride may also be made by reacting the acid with $P_2O_5$ to produce the anhydride directly. Other conventional methods for the preparation of the anhydrides can be employed as preferred for a specific anhydride.

Substantially any halogen-containing aliphatic acid can be utilized to produce the anhydride, and there are many fluorine and chlorine-containing acids, such as monocarboxylic and dicarboxylic, known in the art.

The preferred halogenated aliphatic acids from which are formed the anhydrides employed in the process of the invention are represented by the formulae:

$$X(CCl_2)_nCOOH$$
$$X(CF_2)_nCOOH$$
$$R_fOCF_2CF_2COOH$$
$$Z\text{—}CFCl(CF_2\text{—}CFCl)_mCF_2COOH$$
$$Z\text{—}(CF_2\text{—}CFCl)_mCF_2COOH; \text{ and}$$
$$CF_2ClCF_2\text{—}(CFClCF_2)_mCFClCOOH$$

where X is a member of the group consisting of hydrogen, chlorine, fluorine and a carboxylic acid radical; Z is a perhalomethyl radical having a total atomic weight not greater than 146.5, or a carboxylic acid radical; $R_f$ is a perfluoroalkyl radical having from 1 to 8 carbon atoms; $n$ is an integer from 1 to 12; and $m$ is a number from 0 to 5.

The formulae $$Z(CF_2CFCl)_mCF_2COOH$$

and $$Z\text{—}CFCl(CF_2\text{—}CFCl)_mCF_2COOH$$

are typical of acids derived from oxidation and hydrolysis of polymers including halogenated telomers of such perhalogenated monomers as chlorotrifluoroethylene and the like.

Telomers produced using bromotrichloromethane as a telogen ultimately yield (after oxidation) acids having a terminal trichloromethyl group. Telomers produced using perhalomethanes other than bromotrichloromethane as telogens also yield acids corresponding to the above formulae. The requirement is that the telogens contain a bromine atom and do not produce, at the end of the telomer molecule opposite the bromine atom, an end-group which is more easily hydrolyzed than the CFClBr end-group which is readily converted to a carboxylic acid end-group during oxidation of the telomer. Suitable telogens other than bromotrichloromethane are the perhalogenated methanes; bromotrifluoromethane, bromochlorodifluoromethane, bromodichlorofluoromethane, dibromodifluoromethane and dibromochlorofluoromethane. All of these latter telogens produce telomers containing a CFClBr group at one end of the molecule, and contain at the opposite end a perhalomethyl group which is not more susceptible to hydrolysis than the aforesaid CFClBr group, such as $CF_3$, $CClF_2$, $CFCl_2$, $CBrF_2$ and $CFClBr$. For convenience, these perhalomethyl terminal groups may be designated collectively as those having a total atomic weight not higher than 146.5, the atomic weight of the bromochlorofluoromethyl group.

These materials can be hydrolyzed, as with fuming sulfuric acid, as described in United States Patents Nos. 2,806,665 and 2,806,666, to yield a variety of halogen-containing mono and diacids. Oxidation of the polymers as described in United States Patent No. 2,863,916 also yields halogen-containing acids of this type. Such acids made by either method are equivalents for the purposes of this invention.

Acids of the formula $$X(CF_2)_nCOOH$$

when X is F, are simple perfluoroalkanoic acids and are available by electrochemical fluorination of the appropriate alkanoic acid. Such acids are described, for example, in United States Patent No. 2,567,011. Acids in which X is H are described in United States Patents Nos. 2,559,629 and 2,559,630. Acids in which X is Cl are prepared by oxidation of alpha-hydro-omega-chloro perfluoroalkanes as described by Severson and Brice in Journal of the American Chemical Society, vol. 80, pages 2313–2316 (1958). The chlorinated acids of the formula $$X(CCl_2)_nCOOH$$

when X is chlorine or hydrogen, are well-known in the art and have been available for many years. The halogen-containing dicarboxylic acids are known in the art, such as in Patent No. 2,606,206.

Acids of the type $R_fOCF_2CF_2COOH$, and from them the anhydrides, are available as described in United States Patent No. 2,713,593.

As previously discussed, the acids are converted to the anhydrides by any convenient method known to those skilled in the art. Certain of the telomer acids of chlorotrifluoroethylene are formed directly as anhydrides as shown in United States Patent No. 2,806,865 and may be isolated as such. The anhydrides are then utilized in the process of the invention to produce the acyl nitrites.

Examples of suitable aliphatic anhydrides for use as the starting material in the process of this invention include perfluoroacetic anhydride; perfluoropropionic anhydride; perfluorobutyric anhydride; perfluoropentanoic anhydride; perfluorohexanoic anhydride; perfluorooctanoic anhydride; perfluorotetradecanoic anhydride; monofluoroacetic anhydride; difluoroacetic anhydride; alpha-difluoro-beta-difluoropropionic anhydride; omega-hydroperfluoroheptanoic anhydride; trichloroacetic anhydride; monochlorodifluoroacetic anhydride; 1,3-dichloroperfluoro butyric anhydride; 2-chloro-4-trichloroperfluoropentanoic anhydride; 3,5,6-trichloroperfluorohexanoic anhydride; 3,5,7,8-tetrachloroperfluorooctanoic acid; omega-hydroperfluorotridecanoic anhydride; perfluorosuccinic anhydride; perfluoroglutaric anhydride; 3-chloro-perfluoroglutaric anhydride; monochloroperfluorosuccinic anhydride; and beta-trifluoromethoxypropionic anhydride.

The halogen containing aliphatic diacyl nitrites produced from the dianhydrides are new compounds and useful for making nitroso derivatives as above indicated.

The halogen-containing anhydrides prepared from monocarboxylic acids produce ultimately the monoacyl nitrites from which the mononitrosoalkanes are prepared. On the other hand, the halogen-containing anhydrides prepared from dicarboxylic acids yield the diacyl nitrites from which the nitroso nitrites and the dinitrosoalkanes are prepared by decarboxylation of one or both of the acyl nitrite groups.

The halogen-containing acyl nitrites as prepared by the process of the invention are generally yellow liquids, which can be distilled under reduced pressures at temperatures below their decomposition temperature. In general, the boiling points of these liquids at atmospheric pressure are above the temperatures at which they are pyrolyzed to form the corresponding halogen-containing nitrosoalkanes. They are, however, stable at room temperature, about 25° C., for prolonged periods, and in some instances even at 100° C. for periods of at least a few minutes. They are apparently not affected by light of ordinary intensities, although storage in tinted glass or opaque containers is preferable since it is known that the compounds absorb visible and ultraviolet light of certain frequencies. In fact the use of actinic radiation results in decarboxylation of the acyl nitrite group to the nitroso group. If overheated, i.e. at temperatures above about 100° C., they may decompose violently. Thus, greater stability over the heretofore known unhalogenated materials depends upon the presence of a plurality of halogen atoms in the molecule.

In general, the acyl nitrite group of the halogen-containing acyl nitrites react vigorously with water and hydroxylated solvents, e.g. alcohols, to form the acid group. Thus carboxylic acids can be obtained from the acyl nitrites. They react readily with sodium chloride to form nitrosyl chloride, and therefore, in determining the infrared absorption spectra of these compounds, it is necessary to employ cells having silver chloride windows. The compounds exhibit absorption maxima at about 5.07 and 5.85 microns which correspond to nitrosyl and carbonyl groups, respectively.

The acyl nitrites are also reactive with metals. For example, they react with metals such as zinc, lead, aluminum, nickel, iron, mercury, copper and silver to form the salt of the corresponding acid. They do not react with platinum, and hence platinum or platinum-lined equipment can be used in working with the compounds.

It will be understood that the terms "aliphatic anhydrides," "aliphatic acyl nitrites" and "nitrosoalkanes" are intended to embrace also the series of compounds containing a hetero atom, such as an oxygen atom, in the carbon chain.

The nitrosoalkanes formed by the decarboxylation of the corresponding halogen-containing aliphatic acyl nitrites are useful comonomers with olefins for the preparation of copolymers including greases, waxes and elastomers having advantageous properties. For example, the copolymer of trifluoronitrosomethane and tetrafluoroethylene is a rubber with good low-temperature flexibility and excellent solvent-resistance. The other nitrosoalkanes which can be produced from the compounds prepared by the process of this invention likewise serve as comonomers with tetrafluoroethylene to produce useful plastic or elastomeric copolymers.

The preferred reactions utilized to prepare the various precursors and intermediates of this invention are listed below. In the formulae representing the reactants, R is hydrogen, a halogen, preferably fluorine and chlorine, or an organic radical, such as an alkyl radical, preferably a halogen-substituted organic radical in which the halogens are fluorine and chlorine. The symbol X represents a gaseous halogen, i.e. fluorine or chlorine.

$RCX_2COOH + PCl_3 \rightarrow RCX_2COCl + POCl + HCl$

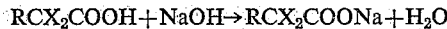
$RCX_2COOH + NaOH \rightarrow RCX_2COONa + H_2O$

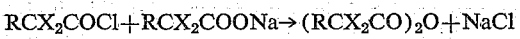
$RCX_2COCl + RCX_2COONa \rightarrow (RCX_2CO)_2O + NaCl$

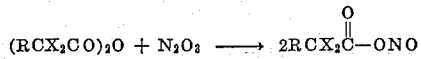
$$(RCX_2CO)_2O + N_2O_3 \longrightarrow 2RCX_2\overset{O}{\underset{\|}{C}}-ONO$$

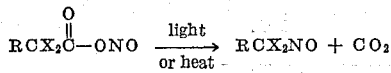
$$RCX_2\overset{O}{\underset{\|}{C}}-ONO \xrightarrow[\text{or heat}]{\text{light}} RCX_2NO + CO_2$$

The drawing illustrates a continuous process for producing the nitrite and the conversion of the acyl nitrite to the nitrosoalkane by decarboxylation. In producing the acyl nitrite, it is desirable to operate in such a manner as to avoid the accumulation of large quantities of the acyl nitrite which can detonate if heated under certain conditions at temperatures greater than 150° C. Thus, in a continuous procedure represented by the diagrammatic illustration in the drawing N₂O₄ is introduced into reduction vessel 4 through conduit 2 to form a liquid layer therein. Then nitric oxide is introduced through line 3 into vessel 4 below the liquid level of N₂O₄ until all the N₂O₄ is reduced to nitrogen sesquioxide (N₂O₃). Streams of N₂O₃ from conduit 5 and the anhydride from conduit 7 are blended in mixing chamber 6 and tube 8 where the length and/or flow rate is regulated such that the disappearance of the blue color of unreacted N₂O₃ occurs just as the flowing liquid reaction mixture emerges from conduit 8 into a decarboxylation stage of the reactor 11. Prior to decarboxylation or pyrolysis, the nitrite may be cooled and/or preheated, as desired, in unit 9. Following decarboxylation reactor 11, the nitrosoalkane thus produced is passed through conduit 12 to scrubber 13 and is counter-currently scrubbed with water to remove CO₂ and traces of oxides of nitrogen. Water is introduced into scrubber 13 through conduit 14 and removed through conduit 15. Scrubbed nitrosoalkane product is recovered from the process through conduit 16. Since this process does not involve radical transfer agents which cannot be removed by water and scrubbing, the nitroso monomer obtained can usually be employed directly in polymerization thereof without the necessity of fractional distillation. The nitroso product may be cooled to a low temperature, such as Dry Ice temperature, prior to water scrubbing, if desired.

The following examples are offered as a better understanding of the present invention and indicate the preparation of the fluorine-containing acyl nitrite and the conversion of the acyl nitrite to the corresponding nitrosoalkane. The examples further show the polymerization of the nitrosoalkane to produce an elastomeric polymer. The examples are not to be construed as unnecessarily limiting to the present invention.

EXAMPLE I

Nitrogen sesquioxide (N₂O₃) was prepared by first condensing dinitrogen tetroxide (N₂O₄) into a dropping funnel chilled at −78° C. Nitric oxide (NO) was then sparged into the liquid (usually partially solidified) N₂O₄ until all N₂O₄ was reduced to N₂O₃ as evidenced by the deep blue color of the N₂O₃ and evolution of unreacted NO. Trifluoroacetic anhydride (14.9 gms.) at 0° C. was then titrated with the nitrogen sesquioxide to an end-point indicated by the maintenance of blue color in the reaction mixture. At this point, one mol of N₂O₃ had combined with one mol of trifluoroacetic anhydride as represented in the following equation:

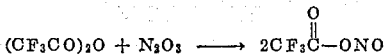
$$(CF_3CO)_2O + N_2O_3 \longrightarrow 2CF_3\overset{O}{\underset{\|}{C}}-ONO$$

The acyl nitrite

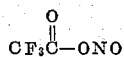
$$CF_3\overset{O}{\underset{\|}{C}}-ONO$$

was isolated by distillation of the mixture (B.P. 45.0°–47.5°/65 mm.) and identified by its I.R. spectrum. The yield was 16.9 gms. (83% based on anhydride). The reverse process, i.e. titration of N₂O₃ with anhydride, works equally well.

For example, (CF₃CO)₂O (27.7 gms.) was added in small amounts over a period of 45 minutes to N₂O₃ at −5° C. until the color of the solution changed from blue to amber. Any excess of anhydride was removed under reduced pressure (80 mm. at room temperature). The yield of nitrosyl perfluoroacetate

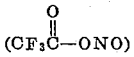
$$(CF_3\overset{O}{\underset{\|}{C}}-ONO)$$

was 88% based on anhydride. In a similar experiment the anhydride was added over a period of two to three minutes, and the solution stirred at −5° C. The color change occurred 15 minutes after addition of the anhydride. The acyl nitrite thus obtained can be converted to the corresponding nitrosoalkane.

EXAMPLE II

For this and the following examples, N₂O₃ was prepared by blending streams of gaseous NO and O₂ at a mol ratio of 5 to 1 so that a significant excess of NO was always present. The mixed oxides of nitrogen were condensed into a Dry-Ice cooled receiver as blue liquid N₂O₃. Excess NO passed out overhead. The liquid (sometimes partially solidified) N₂O₃ was then poured into a stainless steel cylinder where it could be stored under pressure for convenient liquid phase dispensing. Into a 30 ml. Pyrex ampoule was introduced 9 gms. (.104 mol) of liquid nitrogen sesquioxide (N₂O₃). This was frozen in liquid air. Next, with precautions to exclude moisture, 25 gms. (.119 mol) of trifluoroacetic anhydride

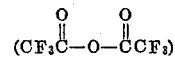
$$(CF_3\overset{O}{\underset{\|}{C}}-O-\overset{O}{\underset{\|}{C}}CF_3)$$

was introduced in slight excess into the Pyrex ampoule. The ampoule and contents were chilled to liquid nitrogen temperature and sealed under vacuum, warmed to Dry-Ice temperature, then immersed in a bath at 25° C. with agitation to mix the mutually soluble reactants. After 3.5 minutes the blue color of the N₂O₃ had entirely disappeared. The liquid product had the straw color with brown overhead vapors characteristic of $$CF_3\overset{O}{\overset{\|}{C}}ONO$$

Upon recovery and analysis, it was found that $$CF_3\overset{O}{\overset{\|}{C}}ONO$$

had been formed in essentially quantitative yield.

EXAMPLE III

The process of Example II was repeated using perfluorooctanoic anhydride, 50 gms. (.055 mol) and an equivalent quantity, 4.18 gms., of N₂O₃. After 23 minutes at room temperature, an essentially quantitative yield of nitrosyl perfluorooctanate, a rather viscous yellow oil, B.P. 55–60° C. at ca. 1.5 mm. Hg, was obtained.

EXAMPLE IV

The process of Example II was repeated using perfluoropropionic anhydride, 25 gms. (.08 mol) and an equivalent quantity, 6.08 gms., of N₂O₃. After three and one-half minutes at room temperature, a 93% yield of nitrosyl perfluoropropionate, B.P. 49° C. at ca. 50 mm. Hg, was obtained.

EXAMPLE V

The process of Example III was repeated using perfluorobutyric anhydride, 25 gms. (.061 mol) and an equivalent quantity (4.6 gms.) N₂O₃. After three minutes at room temperature an essentially quantitative yield of nitrosyl perfluorobutyrate, B.P. 53° C. at 22 mm. Hg, was obtained.

EXAMPLE VI

Other runs were carried out by the method of Example II to produce various anhydrides. The conditions and results of such runs are shown in Table I below:

Table 1

| Anhydride | Gms. | Mols | N₂O₃ | Reaction Time @ R.T. | Nitrite | B.P. |
|---|---|---|---|---|---|---|
| $(CF_3OC_2F_4\overset{O}{\overset{\|}{C}})_2O$ | 30 | .068 | 5.1 | 14 mins | $CF_3OC_2F_4\overset{O}{\overset{\|}{C}}ONO$ | 55/20 mm. |
| $(CF_2ClCF_2CFCl CO)_2O$ | 50 | .105 | 7.9 | 3 hrs | $CF_2ClCF_2CFCl\overset{O}{\overset{\|}{C}}ONO$ | 135/10 mm. |
| $(H(CF_2)_4CO)_2O$ | 35 | .074 | 5.6 | 8 mins | $H(CF_2)_4\overset{O}{\overset{\|}{C}}ONO$ | 69/10 mm. |
| $(H(CF_2)_6CO)_2O$ | 50 | .074 | 5.6 | 8 mins | $H(CF_2)_6\overset{O}{\overset{\|}{C}}ONO$ | 57/1.5 mm. |
| $(ClCF_2CO)_2O$ | 25 | .103 | 7.8 | 6 mins | $ClCF_2COONO$ | 52/20 mm. |
| $(Cl_3CO)_2O$ | 35 | .123 | ¹ 7.6 | 24 hrs | $CCl_3\overset{O}{\overset{\|}{C}}ONO$ | 65/5 mm. |

¹ Less than theoretical.

EXAMPLE VII

This example relates to the pyrolysis of the nitrile to produce the nitrosoalkane. The apparatus employed comprised a metering and vaporizing device, a 28-foot long half-inch I.D. glass pyrolysis tube and provision for aqueous scrubbing and condensing of gaseous products. Liquid $$CF_3\overset{O}{\overset{\|}{C}}-ONO$$

stored in a dropping funnel, was admitted into the metering system. This metering system comprised two chambers inter-connected by a capillary tube. In the first chamber was maintained a certain liquid level of nitrite above the inlet of the capillary tube. The other end of the capillary tube containing an asbestos wick opened into a flashing chamber which in turn fed directly into the pyrolysis tube. The first chamber of the metering system was maintained at 0° C. while the flashing chamber was maintained at 85° C. by an oil bath. The first chamber was maintained at 120 mm. (abs.) pressure while the flashing chamber and down-stream portion of the system were maintained at 56 mm. (abs.) pressure, thus providing a 64 mm. differential across the capillary. The liquid $$CF_3\overset{O}{\overset{\|}{C}}-ONO$$

was thus drawn from the first chamber into the flashing chamber at a rate of 10.6 gms./hr. This produced a residence time in the 180° C. pyrolysis tube of approximately 70 seconds. After a total running time of 105 minutes, 18.5 gms.

$$CF_3\overset{O}{\overset{\|}{C}}-ONO$$

had been passed into the reactor. Unreacted starting material (1.0 gm.) was collected in a Dry-Ice chilled trap at the end of the pyrolysis tube. The gaseous products consisting of CO₂, CF₃NO, and small amounts of side products, such as oxides of nitrogen and COF₂ were collected in liquid air-cooled traps. This gaseous product was shunted through a counter-current water scrubber followed by a CaSO₄ drier and a tube containing a "molecular sieve" which removed last traces of impurity. A 90% conversion was obtained with a 60% yield based on nitrite consumed.

EXAMPLE VIII

This example relates to the polymerization of the nitrosoalkane produced in accordance with this invention. Into a 30-ml. Pyrex ampoule was introduced 50 gms. of tetrafluoroethylene followed by 50 gms. of trifluoronitrosomethane (CF₃NO). The CF₃NO employed was taken directly from the above described pyrolysis-scrubbing operation of Example VII and employed in the crude state. The careful and laborious fractional distillation which had heretofore been necessary for removal of CF₃I, CF₃Br and other impurities capable of interfering with the polymerization reaction was not carried out.

The ampoule and contents were chilled under liquid nitrogen temperature and then sealed under vacuum so that oxygen was eliminated from the reaction zone. The ampoule was allowed to warm to −30° C. After 8 hours, the polymerization was complete as evidenced by the disappearance of the characteristic blue color of CF₃NO. The elastomeric polymer formed had an inherent viscosity of 0.7 in triperfluorobutyl nitrile, indicating that the process for preparation of $CF_3NO$ described above neither employs a starting material nor produces side products which are capable of interfering with the polymerization reaction by radical chain transfer and which cannot be removed by the counter-current aqueous scrubbing process of Example VII.

EXAMPLE IX

This example relates to the preparation of (dinitrosyl perfluorosuccinate) perfluorosuccinyl dinitrite and derivaties thereof. Dinitrogen trioxide (15 gms., 0.197 mol) was condensed into a 250-ml. flask cooled by Dry Ice and fitted with a Dry Ice-cooled reflux condenser. Perfluorosuccinic anhydride (16.0 gms., 0.093 mol) was then added and the flask was warmed to 0° C. by means of an ice bath. After fifteen minutes, the ice bath was removed and the flask was maintained at room temperature for thirty minutes. Excess dinitrogen trioxide was removed at reduced pressure (1 mm.) at room temperature yielding 21.0 gms. (91% yield) of dinitrosyl perfluorosuccinate, a yellow crystalline material, M.P. 44–48° C. Heating the compound to its melting point or higher in a nitrogen atmosphere or at reduced pressure resulted in decomposition to perfluorosuccinic anhydride and dinitrogen trioxide. This decomposition also occurred slowly at room temperature unless the compound was kept in a sealed tube. This apparent equilibrium results in the loss of small amounts of dinitrogen trioxide (and formation of small amounts of perfluorosuccinic anhydride) when handling the compound and is responsible for the somewhat high fluorine and low nitrogen values obtained.

*Analysis.*—Calculated for $C_4F_4N_2O_6$: C, 19.4; F, 30.7; N, 11.3. Found: C, 19.6; F, 31.7; N, 10.5.

A single NMR peak at $\phi^{*6}=126.0$ was obtained in conformity with the proposed structure. 5.2 gms. of the above dinitrite was placed in a quartz ampoule connected to a Dry Ice trap and a vacuum pump. The ampoule was placed in a Vycor Dewar containing ice water and irradiated by means of a sun-lamp for eighteen hours at a pressure of 1 mm. At the end of this time, 2.2 gms. of the dinitrite had been decarboxylated to omega nitroso perfluoropropionyl nitrite which was collected in the Dry Ice trap in the form of a blue-green liquid. This nitroso compound was reacted with water to give a blue aqueous solution. Extraction of the water with ether followed by evaporation of the ether left 1.6 gms. of a deep blue liquid. The IR spectrum of this liquid showed it to be fluorocarbon acid containing a nitroso group, consistent with the structure $HOOCCF_2CF_2NO$, omega nitroso perfluoropropionic acid.

Similarly, perfluoroglutaric anhydride reacted with $N_2O_3$ under the above conditions produces perfluoroglutaryl dinitrite (M.P. 45–53° C.). This dinitrite, upon decarboxylation in the above manner, produces omega nitroso perfluorobutyryl nitrite which in turn is converted to the omega nitroso perfluorobutyric acid by hydrolysis.

Various process techniques and various reaction conditions may be utilized to effect the reaction without departing from the scope of this invention.

Having described our invention, we claim:

1. A process for preparing an aliphatic halogen-containing acyl nitrite which comprises reacting an aliphatic anhydride containing at least one halogen substitution on each of the apha carbon atoms and which anhydride contains only halogen substitution with nitrogen sesquioxide.
2. The process of claim 1 in which the anhydride is an anhydride of a monocarboxylic acid.
3. The process of claim 1 in which the anhydride is an anhydride of a dicarboxylic acid.
4. The process of claim 1 in which each of the alpha carbon atoms of the anhydride are completely halogen-substituted.
5. A process for preparing an aliphatic halogen-containing acyl nitrite which comprises reacting an aliphatic anhydride containing at least two halogen substitutions on each of the alpha carbon atoms and which anhydride contains only halogen substitution with nitrogen sesquioxide under liquid phase conditions at a temperature between about −50° C. and about 110° C.
6. The process of claim 5 in which the anhydride is trichloroacetic anhydride.
7. The process of claim 5 in which the anhydride is a fluorine-containing anhydride.
8. The process of claim 7 in which the anhydride is trifluoroacetic anhydride.
9. The process of claim 7 in which the anhydride is perfluoropropionic anhydride.
10. The process of claim 7 in which the anhydride is perfluorobutyric anhydride.
11. The process of claim 7 in which the anhydride is perfluorooctanoic anhydride.
12. The process of claim 7 in which the anhydride is completely halogen-substituted.
13. A process for preparing a halogen-containing nitrosoalkane which comprises reacting an aliphatic anhydride containing at least one halogen substitution on each of the alpha carbon atoms and which anhydride contains only halogen substitution in the liquid phase with nitrogen sesquioxide to produce the corresponding halogen-containing acyl nitrite and decarboxylating the acyl nitrite to produce the corresponding halogen-containing nitrosoalkane.
14. An aliphatic halogen-containing diacyl nitrite.
15. Perfluorosuccinyl dinitrite.
16. Perfluoroglutaryl dinitrite.

No references cited.

CARL D. QUARFORTH, *Primary Examiner.*

LEON D. ROSDOL, *Examiner.*